United States Patent
Sadler et al.

(10) Patent No.: US 7,148,789 B2
(45) Date of Patent: Dec. 12, 2006

(54) HANDHELD DEVICE HAVING MULTIPLE LOCALIZED FORCE FEEDBACK

(75) Inventors: Daniel J. Sadler, Gilbert, AZ (US);
Michael E. Caine, Needham, MA (US);
Angela Chang, Cambridge, MA (US);
Xunhu Dai, Gilbert, AZ (US); Claudia Jensen, Mesa, AZ (US); Daniel Zindel, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 170 days.

(21) Appl. No.: 10/937,821

(22) Filed: Sep. 9, 2004

(65) Prior Publication Data
US 2006/0049920 A1    Mar. 9, 2006

(51) Int. Cl.
*H04B 3/36* (2006.01)
(52) U.S. Cl. .............. 340/407.1; 340/407.2; 340/384.5; 340/384.6; 340/384.7; 340/384.73
(58) Field of Classification Search ............. 340/407.1, 340/407.2, 384.5, 384.6, 384.7, 384.73, 5.61, 340/7.2; 455/90.3, 556.1, 563, 569, 575; 310/317, 328, 330, 311
See application file for complete search history.

(56) References Cited

U.S. PATENT DOCUMENTS

| 6,230,135 | B1 | 5/2001 | Ramsay et al. |
| 6,326,901 | B1 | 12/2001 | Gonzales |
| 6,429,846 | B1 | 8/2002 | Rosenberg et al. |
| 6,710,518 | B1 | 3/2004 | Morton et al. |
| 6,819,939 | B1* | 11/2004 | Masamura ............... 455/550.1 |
| 7,006,641 | B1* | 2/2006 | Saiki et al. ................... 381/98 |
| 2001/0019324 | A1 | 9/2001 | Rosenberg |
| 2002/0033795 | A1 | 3/2002 | Shahoian et al. |
| 2002/0075135 | A1 | 6/2002 | Bown |
| 2003/0174121 | A1* | 9/2003 | Poupyrev et al. |

OTHER PUBLICATIONS

Poupyrev et al., Touch Engine: A tactile Display for Handheld Devices, article, Conference on Human Factors in Computing Systems, Minneapolis, MN, Apr. 20-25, 2002, pp. 644-645.

* cited by examiner

*Primary Examiner*—Hung Nguyen

(57) ABSTRACT

An electronic device (100) comprises a housing (112), an input (118, 122) coupled mechanically to the housing for receiving data, an output (114, 118) coupled mechanically to the housing for presenting information to a user of the electronic device in at least one of an audio and visual mode, an electronic circuit (210) coupled mechanically to the housing for providing intelligent operations that receives the data from the input and provides the information to the output, and at least two electromechanical transducers (226), each providing a tactile alert to the user in response to the data, the tactile alerts occurring simultaneously or in succession.

22 Claims, 3 Drawing Sheets

… (US 7,148,789 B2)

HANDHELD DEVICE HAVING MULTIPLE LOCALIZED FORCE FEEDBACK

FIELD OF INVENTION

The present invention generally relates to manually operable controls for electronic devices and more particularly to a device for providing active, content related tactile force feedback to the user of electronic devices.

BACKGROUND OF THE INVENTION

In the past decade a variety of electronic devices, including portable electronic devices have come into wide spread use. In the design of electronic devices that are portable, emphasis is placed on reducing the space occupied by each individual component, and reducing the cost.

Given the rapid introduction of these new types of portable electronic devices (e.g., Personal Digital Assistants, Text messaging pagers, MP3 players, cell phones), and the rapid development of novel functionality, an important objective in designing electronic devices is to provide intuitive user interfaces. Computer mouse-like keys and qwerty keyboards are some examples providing intuitive interfaces. However, these interfaces are directed more at providing input to the electronic device rather than providing content related feedback to a user. Touch screens along with graphical user interfaces (GUI) provide information to the user, but only if the user is looking at the screen.

Devices more recently are actively responding to user input by providing tactile cues or responses to the user. The vibrator in a cell phone or pager is a good example. Other examples include an input key that provides a clicking sound when moved; a key or touch screen that moves suddenly or vibrates in an opposed direction to the input; and a key that moves suddenly or vibrates perpendicular to the direction of input in response to a transducer attached to the device housing. However, all the devices mentioned here are implemented such that the component which supplies the sudden movement or vibration is mounted on the device housing, causing a vibration in the housing and resulting in a reduced or confusing sensation to the user. Thus, these implementations are limited in the amount of information they can provide.

SUMMARY OF THE INVENTION

An electronic device comprises a housing, an input coupled mechanically to the housing for receiving data, an output coupled mechanically to the housing for presenting information to a user of the electronic device in at least one of an audio and visual mode, an electronic circuit coupled mechanically to the housing for providing intelligent operations that receives the data from the input and provides the information to the output, and at least two electromechanical transducers, each providing a tactile alert to the user in response to the data, the tactile alerts occurring simultaneously or in succession.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside in the details of construction and operation as more fully hereafter depicted, described and claimed—reference being made to the accompanying drawings forming a part hereof, wherein like numerals refer to like parts throughout. Other elements, operational features, applications and/or advantages will become apparent to skilled artisans in light of certain exemplary embodiments recited in the Detailed Description, wherein:

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms 'first', 'second', and the like herein, if any, are used for distinguishing between similar elements and not necessarily for describing a sequential or chronological order. Moreover, the terms front, back, top, bottom, over, under, and the like in the Description and/or in the claims, if any, are generally employed for descriptive purposes and not necessarily for comprehensively describing exclusive relative position. Skilled artisans will therefore understand that any of the preceding terms so used may be interchanged under appropriate circumstances such that various embodiments of the invention described herein, for example, are capable of operation in other orientations than those explicitly illustrated or otherwise described.

DETAILED DESCRIPTION OF EXEMPLARY EMBODIMENTS

Figure 1:
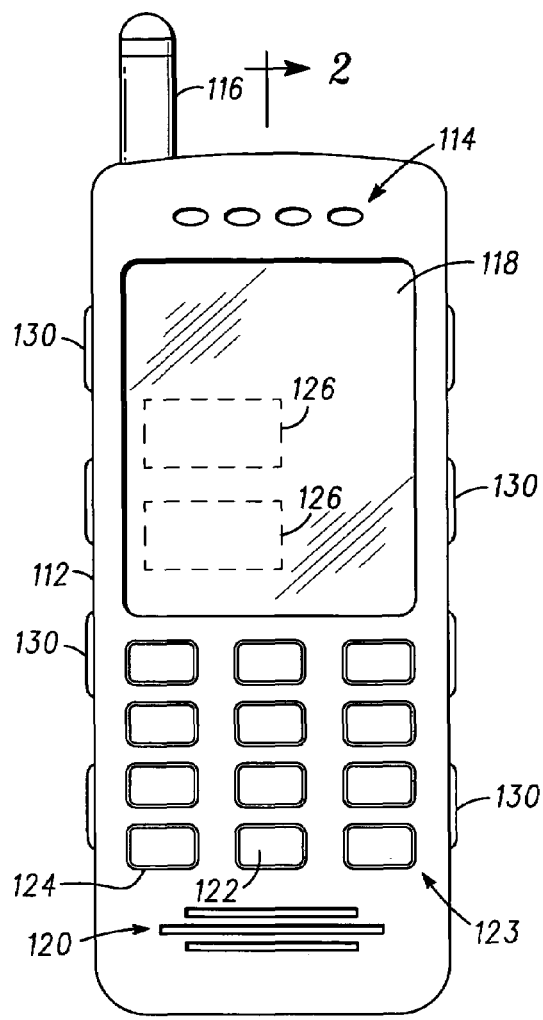
FIG. 1 is a front view of an electronic device according to the preferred embodiment of the invention.
Figure 2:
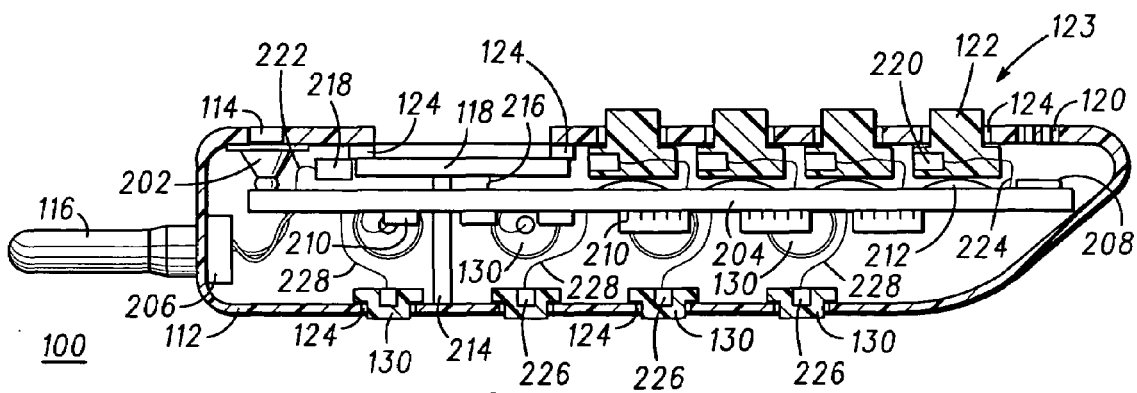
FIG. 2 is a sectional side view of the electronic device shown in FIG. 1.

FIG. 1 is a front view of an electronic device according to one embodiment of the invention and FIG. 2 is a sectional side view of the electronic device shown in FIG. 1. As shown in FIGS. 1 and 2, the electronic device comprises a cellular phone 100, although it should be understood that it could alternatively comprise other types of electronic devices such as a corded telephone, cordless telephone, hand-held game, Personal Digital Assistant, or pager. Such alternative devices may not include all the elements, such as an antenna or speaker, shown on the cellular phone 100. The cellular phone 100 and all such alternative devices comprise electronics that performs intelligent operations. The cellular phone 100, as shown, includes a housing 112. The housing 112 includes an audio output grid 114, overlying a speaker 202 attached to a circuit board 204. An antenna 116 is provided for receiving and transmitting RF communication signals and is attached to the housing 112, for example, by a nut 206. A display 118 is providing for displaying information, such as stored cellular phone numbers and caller ID information to a user. An audio input aperture grid 120 is provided for coupling sound including a user's utterances to a microphone 208. The circuit board 204 supports and electrically couples circuit components 210 that make up one or more electrical circuits that are part of the cellular phone 100 and provide intelligent operations. The circuit board 204 also supports the speaker 202, and the microphone 208. The cellular phone 100 includes one or more keys 122, or buttons, that may control any of several functions such as menu selection, navigation, and data input.

There are various methods of providing input to a device such as the electronic device 100, including the keys 122 and the display 118. It is well known in the art that displays may comprise "touch screens" wherein a person may touch a spot on the display with a finger or a stylus for providing information to the electronic device. Such contact by a finger or stylus provides an electrical signal through electrical coupling 216.

The keys 122 protrude through an opening 123 in the housing 112. The display 118 and keys 122 are both cushioned from the housing 112 by a soft material 124, such as silicon rubber, that dampens any vibration from passing to or from the housing 112. The material also serves to prevent dust and moisture from entering into the housing 112. The display 118 is also connecting to housing 112 by arms 214. Arms 214 provide support to the display 118 by maintaining its position against the soft material 124. Arms 214 is substantially rigid along the Z direction (perpendicular to the display plane), but compliant in X, Y directions (in the display plane), allowing the screen 118 to have small lateral displacement to provide haptic feedback to the user.

An input mechanism such as the display 118 and/or the key 122 may be configured for providing active tactile force feedback. An electromechanical transducer 218, such as a voice-coil based linear vibration motor, a piezoelectric actuator or vibrator, or the like, is mechanically connected directly to the display 118, and an electromechanical transducer 220, such as a vibrator, or the like, is mechanically connected directly to the key 122. The electromechanical transducer 218 is positioned so the movement provided to the display 118 is in the "x" or "y" direction parallel to the plane of the display 118 (a lateral motion that is perpendicular to the direction in which the user pushes the screen). The electromagnetic transducer 218 may be mounted on the side of display 118, as shown in FIG. 2, or on the back of display 118 (not shown in FIG. 2). The electromechanical transducer 220 may be positioned inside the key 122 as shown in FIG. 2, or in any of several other positions as described later so that the movement provided to the key 122 is in the "x", "y" or "z" direction or some combination thereof. The electromechanical transducers 218 and 220 serve to convert electrical signals to mechanical movement. By having the electromechanical transducers 218 and 220 connected only to the display 118 and key 122, respectively, little or no vibration is transferred to the housing 112. Electrical connections to the electromechanical transducers 218 and 220 are made to the circuit board 204 by a twisted pair of leads 222 and 224, respectively, or flex circuitry, but such wiring transmits substantially no vibrations to the circuit board 204.

In the state shown in FIG. 1, two virtual keys 126 are presented on the display 118. Although only two virtual keys 126 are shown, it should be understood there could be only one, or several. When a user presses directly, or with a stylus, on a portion of the touch screen overlying one of the virtual buttons 126, the press will be detected and in response thereto the electromechanical transducer 218 will be driven causing the electromechanical transducer 218 to emit mechanical energy that is coupled to the touch screen (and through the stylus if used). The mechanical energy is felt by the user as one or more impulses (a tactile response). The impulse(s) serve to confirm to the user that the intended input has been registered by the cellular phone 100. In other words, the user receives acknowledgement of the intended input. The electromechanical transducer 218 is preferably driven with a signal that includes one or more sharp steps. Driving the electromechanical transducer 218 with a signal that includes one or more sharp steps causes the touch screen 118 to be jolted. Also any other user-defined wave forms could be used to actuate the electromechanical transducer. The jolt may comprise information based on intelligent operations performed by the circuit components 210. If the cellular phone 100 was being held by the user, the jolt would only be felt through the display 18 and not the housing 112.

Figure 4:
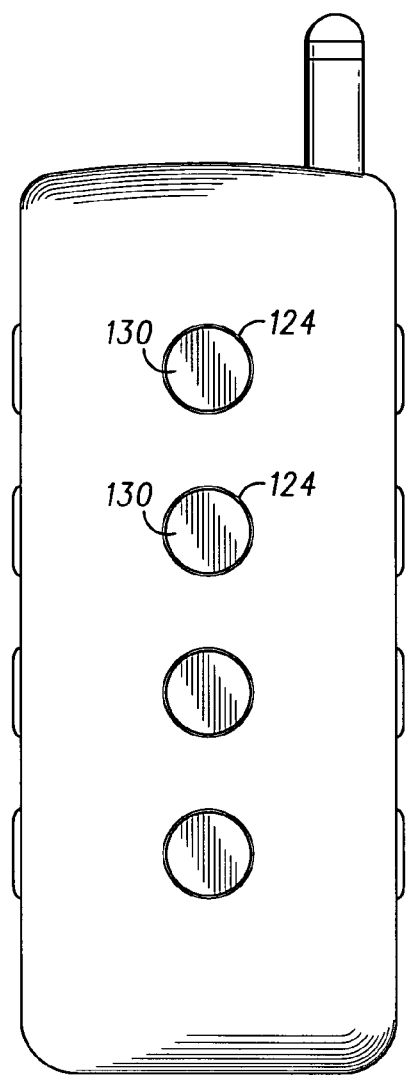
FIG. 4 is a back view of the electronic device shown in FIG. 1.
Figure 3:
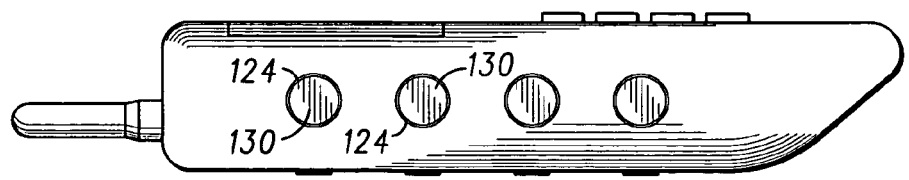
FIG. 3 is a side view of the electronic device shown in FIG. 1.

In accordance with the present invention, the concepts taught above may be expanded upon to provide more complex information via a haptic output (as feedback comprising two or more haptic responses or alerts in different locations (spatially displaced) in response to a single input) to the user. As may be seen in FIGS. 1 and 3, a plurality of haptic points 130 are positioned on the sides and back of the cellular phone 100. FIG. 4 better illustrates the placement of haptic points 130 on the back of cellular phone 100. It should be understood that these haptic points may alternatively be positioned on only one side, only on the back, only on the sides, on the front, or any combination thereof. Further, the number of haptic points 130 may be two or more, though four or five on a side provides the best results. The haptic points 130 are positioned within and cushioned from the housing 112 by a soft material 124, such as silicon rubber, that dampens any vibration from passing to or from the housing 112. Alternatively, a strip of the soft material 124 may be positioned along the sides or back of the cellular phone 100 with two or more haptic points 130 positioned within. The haptic points 130 ideally would be positioned so each one would provide a vibration to a separate finger.

Figure 5:
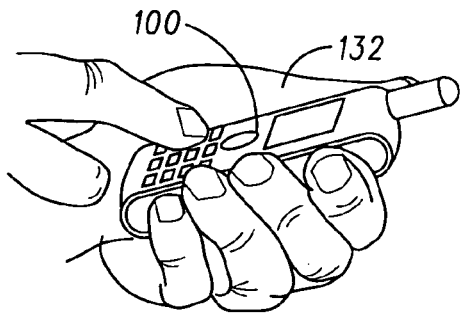
FIG. 5 is a picture of a typical way in which a user would hold the wireless communication device shown in FIGS. 1 and 2 while striking keys.

FIG. 5 illustrates a user holding the cellular phone 100 in a left hand while pushing on a key with a finger on the right hand. Notice how the fingers of the left hand cradle the side of the cellular phone 100 where the haptic points 130 are positioned.

Figure 6:
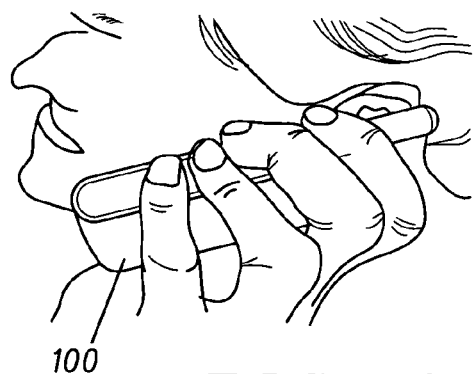
FIG. 6 is a picture of a typical way in which a user would hold the wireless communication device shown in FIGS. 1 and 2 while listening to a call.

FIG. 6 illustrates a user holding the cellular phone 100 with a left hand to the left ear. Notice how the fingers of the left hand cradle the side of the cellular phone 100 where the haptic points 130 are positioned. By placing the haptic points 130 on both sides of the cellular phone 100, the user could hold the cellular phone 100 in either hand with the same result. Furthermore, the haptic points 130 would touch the base of the palm 132 providing a similar sensation.

Figure 7:
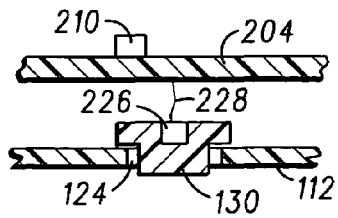
FIG. 7 is an exploded cut away view of another embodiment of a haptic point used in the wireless communication device shown in FIGS. 1 and 2.
Figure 8:
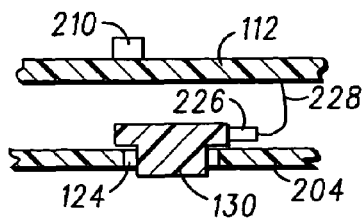
FIG. 8 is an exploded cut away view of yet another embodiment of a switch used in the wireless communication device shown in FIGS. 1 and 2.
Figure 9:
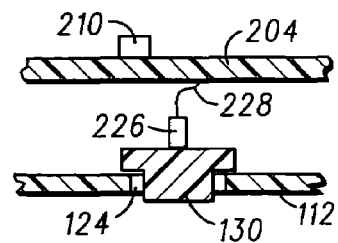
FIG. 9 is an exploded cut away view of still another embodiment of a switch used in the wireless communication device shown in FIGS. 1 and 2

FIGS. 7, 8, and 9 show various methods of placing an electromechanical transducer 226 with the haptic points 130. An electromechanical transducer 226, such as a voice-coil based vibration motor, a piezoelectric actuator or vibrator, or the like, is mechanically connected directly to the haptic point 130. The electromechanical transducer 226 may be positioned inside the haptic point 130 as shown in FIG. 7, or in any of several other positions as shown in FIGS. 8 and 9 so that the movement provided to the haptic point is in the "x", "y" or "z" direction or some combination thereof. The electromechanical transducer 226 serves to convert electrical signals to mechanical movement. By having the electromechanical transducer 226 connected only to the haptic point 130, little or no vibration is transferred to the housing 112. Electrical connections to the electromechanical transducer 226 is made to the circuit board 204 by a twisted pair of leads 228, or flex circuitry, but such wiring transmits substantially no vibrations to the circuit board 204.

Referring to FIG. 8, the electromechanical transducer 226 is connected to the side of the haptic point 130. And FIG. 9 illustrates yet another embodiment wherein the electromechanical transducer 226 is connected to the bottom of the haptic point 130.

Figure 10:
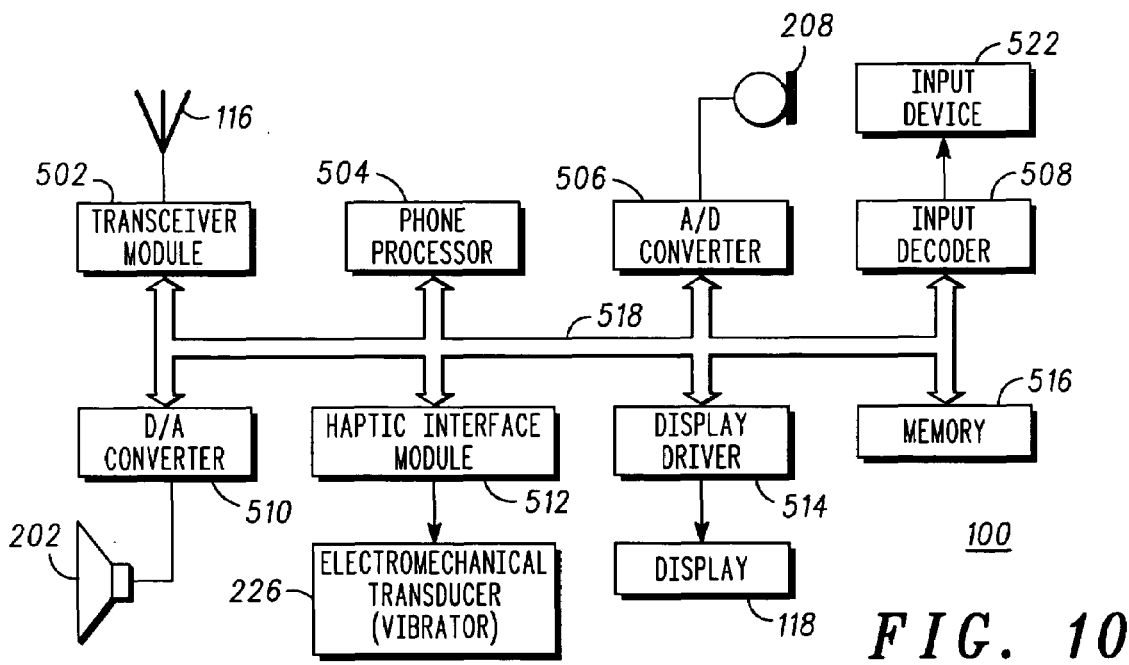
FIG. 10 is a block diagram of the electronic device shown in FIGS. 1 and 2 according to the preferred embodiment of the invention.

Referring to FIG. 10, the cellular phone 100 comprises a transceiver module 502, a phone processor 504, an analog-to-digital converter 506 (A/D), an input decoder 508, a digital-to-analog converter (D/A) 510, a haptic interface module 512, a display driver 514, and a memory module 516 coupled through a digital signal bus 518. The transceiver module 502 is coupled through an antenna 116 to free space. The A/D 506 is coupled to the microphone 208 for receiving audio signals therefrom. The display driver 514 is coupled to the display 118. The D/A 510 is coupled to the speaker 202. The speaker 202 is driven by signals output by the D/A 510.

An input device 522 is coupled to the input decoder 508. When utilizing the keys 122, the input device 522 preferably comprises the keypad 212, and associated metallization (e.g., interdigitated fingers) on the printed circuit board 204. The input decoder 508 serves to identify depressed keys and supply information identifying depressed keys to the phone processor 504. The input decoder 508 is preferably adapted to send an interrupt to the phone processor 504 in response to a key press, and thereafter to provide data identifying a depressed key. Identifying information preferably takes the form of a multibit word that is read by the phone processor 504 in a read operation that is triggered by the interrupt. Rather that using an interrupt, the phone processor 504 can be programmed to periodically read the input decoder 508. The memory module 516 is used to store programs that are executed by the phone processor 504 to control the operation of the cellular phone 100, including the reading of the input decoder 508.

The haptic interface module 512 is configured to output pulses of predetermined or user defined amplitude and duration in response to receiving a trigger signal from the phone processor 504. Alternatively, other interface logic (e.g., address decoding logic) is included between the digital signal bus 518, and the haptic interface module 512. The phone processor 504 is programmed to trigger the haptic interface module 512 in response to a predetermined state as determined by intelligent operations within the phone processor 504. Optionally, the triggering of the haptic interface module 512 can selectively enabled or disabled in accordance with configuration settings that a user can edit. The haptic interface module 512 is coupled to the electromechanical transducers 226. The electromechanical transducer 226 is driven by the output of the haptic interface module 512.

More generally, the electromechanical transducers 226 are preferably driven by a signal that includes at least one approximation of a step function. (Note that a step function is a mathematical ideal that no real world circuit can achieve). A step function includes a broad range of frequencies. By using a driving signal that includes an approximation of a step function, the electromechanical transducer 226 is caused to emit an impulse of mechanical energy that propagates to the haptic point 130 and is felt by a user operating the cellular phone 100. More preferably, the electromechanical transducer 226 is driven by a signal that includes one or more pulses. A pulse, e.g., a single pulse or a complex waveform, is generated in response to each detected state, where a state refers to a particular situation identified by the phone processor 504. Using a known pulse is advantageous in that a known pulse generates an impulse of mechanical energy that creates a tactile sensation that simulates the feel of previous states with which the user may be familiar.

The transceiver module 502, phone processor 504, A/D 506, input decoder 508, D/A 510, haptic interface module 512, display driver 514, memory 516, and display driver 514 are preferably part of an electric circuit that is embodied in the circuit components 210, and interconnecting traces of the circuit board 204.

Alternatively in lieu of using the phone processor 504, a different electric circuit may be used to drive the electromechanical transducer 226 in order to generate tactile feedback to the haptic points 130.

The haptic interface module 512 could alternatively be a pulse generator, generating digital pulses of various widths, heights, and/or frequencies based on instructions from the phone processor 504. Depending on the impedance match to the electromechanical transducer 226 and current sourcing/sinking capability, an amplifier may be needed. Alternatively, the haptic interface module 512 could simply be a current amplifier and pulses would be generated by the phone processor 504 itself. Another possibility is that the haptic interface module 512 comprises multiple DACs which apply analog signals as would be the case if additional audio channels were included.

Figure 11:
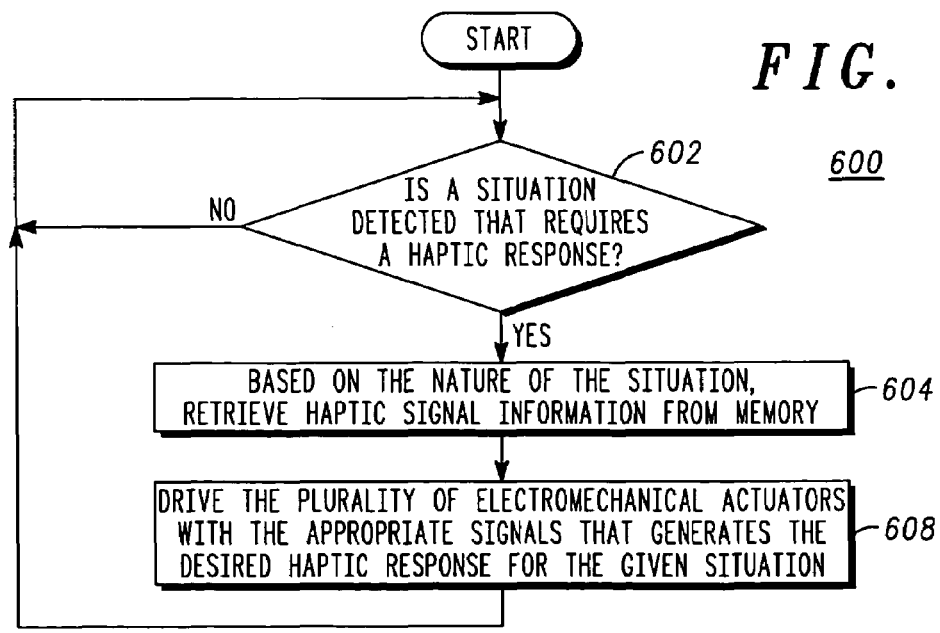
FIG. 11 is a flow diagram of a method for operating the electronic device shown in FIGS. 1 and 2 according to the preferred embodiment of the invention.

FIG. 11 is a flow diagram 600 of a method for operating the wireless communication device shown in FIGS. 1 through 10 according to the preferred embodiment of the invention. Block 602 is a decision block that depends on whether a situation has been detected that requires a haptic response. If not the flow diagram 600 continually loops back and awaits the occurrence of a situation. When a situation is detected, the flow diagram 600 progresses to step 604 in which haptic signal information is retrieved from memory based on the nature of the situation. Once this information is retrieved, the electromechanical transducers 226 are driven to produce tactile feedback.

Various situations could prompt different haptic responses. For example, in a pager or cell phone, a message or call from a spouse might cause all the haptic points 130 to vibrate, or a message or call from a boss might cause the haptic points 130 to vibrate in a circular motion around the electronic device, or a message or call from another might cause the haptic points to vibrate repeatedly up one side of the electronic device. The use of adjacent multiple vibrators in succession as described creates a perceptual illusion of movement (known as the cutaneous rabbit).

This illusion of movement could be used to give directional information for navigation. The movement along a side, around the electronic device 100, back and forth, can also be used to convey information, such as to gather attention, create emphasis, and general non-verbal information. The electronic device 100 can also relay information of its status, such as out of range, low battery, and busy signal. Such information may be valuable while the user is holding the electronic device 100 to his/her ear and cannot readily see information on the screen 118.

The multiple localized force feedback could also be used for sensorial communication. Instead of sending a voice or text message or a picture or a data file, one could send a particular haptic pattern to other users. The pattern could represent a reminder, a certain mood (e.g., thinking of you, love you, missing you, etc.), a particular sensation, or any other user defined contents.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

The invention claimed is:

1. An electronic device for providing tactile feedback to a user in response to a data being received, comprising:
   a housing;
   an input coupled mechanically to the housing for receiving the data;
   an electronic circuit coupled mechanically to the housing for providing intelligent operations in response to the data; and
   at least two electromechanical transducers being spatially displaced and providing the tactile feedback to the user in response to the intelligent operations, the tactile feedback comprising at least one tactile impulse from each of the at least two electromechanical transducers, each of the at least one tactile impulses occurring simultaneously or in succession to convey to the user one of at least two predetermined states.

2. The electronic device of claim 1 wherein each of the electromechanical transducers are positioned so as to provide a vibration to the user's hand.

3. The electronic device of claim 1 wherein the electromechanical transducers are positioned wherein each of the tactile impulses are applied to a different portion of a base of a palm of a hand of the user.

4. The electronic device of claim 1 further comprising a material positioned between each of the electromechanical transducers and the housing, wherein the impulse of each electromechanical transducer is not transmitted to the housing or to another one of the electromechanical transducers.

5. The electronic apparatus of claim 1 wherein the electromechanical transducer moves in one of x, y, and z directions.

6. The electronic device of claim 1 wherein the vibrations occur in a sequence previously defined by the user.

7. The electronic device of claim 1 wherein the electric circuit comprises one or more of a phone and a pager.

8. An electronic device for providing tactile feedback to a user, comprising:
   a housing;
   an output coupled mechanically to the housing for providing at least one of audio and visual information to the user of the electronic device;
   an electronic circuit coupled mechanically to the housing for providing intelligent operations that determines various states, wherein the audio and visual information is provided for one or more of the states; and
   at least two electromechanical transducers being spatially displaced and providing the tactile feedback to the user in response to one of the states, the tactile feedback comprising at least one tactile impulses from each of the at least two electromechanical transducers, each of the at least one tactile impulses occurring simultaneously or in succession to convey to the user the one or more of the states.

9. The electronic device of claim 8 wherein each of the electromechanical transducers are positioned so as to provide a vibration to a different finger of the user.

10. The electronic device of claim 8 wherein the electromechanical transducers are positioned wherein each of the tactile impulses are applied to a different portion of a base of a palm of a hand of the user.

11. The electronic device of claim 8 further comprising a material positioned between each of the electromechanical transducers and the housing, wherein the impulse of each electromechanical transducer is not transmitted to the housing or to another one of the electromechanical transducers.

12. The electronic apparatus of claim 8 wherein the electromechanical transducer moves in one of x, y, and z directions.

13. The electronic device of claim 8 wherein the vibrations occur in a sequence previously defined by the user.

14. The electronic device of claim 8 wherein the electric circuit comprises one or more of a phone, a personal digital assistant, a pager, and a gaming device.

15. An electronic device for receiving data and providing tactile feedback to a user in response to the data being received, comprising:
   a housing;
   an input coupled mechanically to the housing for receiving the data;
   an output coupled mechanically to the housing for presenting information to a user of the electronic device in at least one of an audio and visual mode;
   an electronic circuit coupled mechanically to the housing for providing intelligent operations that receives the data from the input and enables the output; and
   at least two electromechanical transducers being spatially displaced and providing the tactile feedback to the user in response to the intelligent operations, the tactile feedback comprising at least one tactile impulse from each of the at least two electromechanical transducers, each of the at least one tactile impulses occurring simultaneously or in succession, wherein the tactile impulses provide sensorial haptic information to the user.

16. The electronic device of claim 15 wherein the electromechanical transducers are positioned wherein each of the tactile impulses are applied to a different portion of a base of a palm of a hand of the user.

17. The electronic device of claim 15 further comprising a material positioned between each of the electromechanical transducers and the housing, wherein the impulse of each electromechanical transducer is not transmitted to the housing or to another one of the electromechanical transducers.

18. The electronic apparatus of claim 15 wherein the electromechanical transducer moves in one of x, y, and z directions.

19. The electronic device of claim 15 wherein the tactile alert occurs in a sequence previously defined by the user.

20. The electronic device of claim 15 wherein the electric circuit comprises one or more of a phone, a pager, and a gaming device.

21. The electronic device of claim 1 wherein each of the at least two electromechanical transducers are positioned so as to provide a vibration to a different finger of the user.

22. The electronic device of claim 15 wherein each of the at least two electromechanical transducers are positioned so as to provide a vibration to a different finger of the user.

* * * * *